F. MORTON.
SPECTACLES.
APPLICATION FILED SEPT. 13, 1911.
1,024,275.
Patented Apr. 23, 1912.
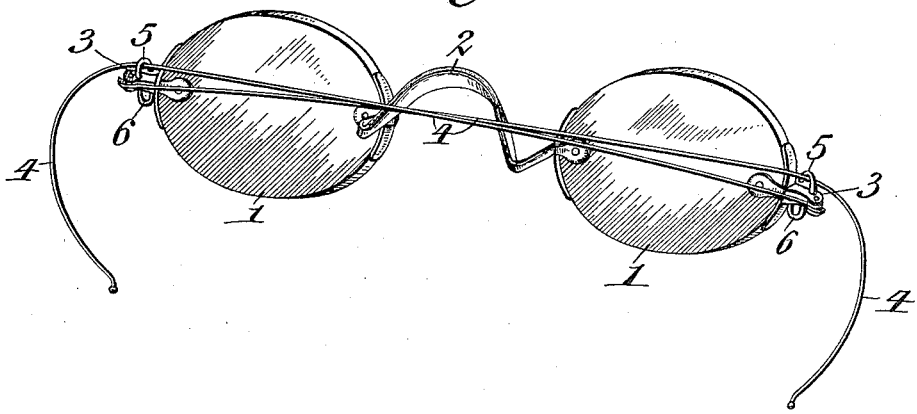
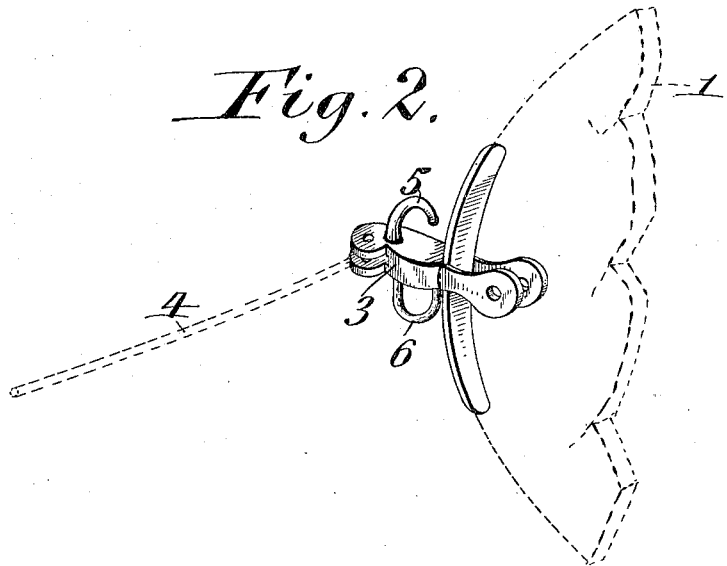

UNITED STATES PATENT OFFICE.

FRANCES MORTON, OF BUFFALO, NEW YORK.

SPECTACLES.

1,024,275.  Specification of Letters Patent.  Patented Apr. 23, 1912.

Application filed September 13, 1911. Serial No. 649,117.

*To all whom it may concern:*

Be it known that I, FRANCES MORTON, a citizen of the United States, residing at Buffalo, in the county of Erie and State of New York, have invented new and useful Improvements in Spectacles, of which the following is a specification.

This invention relates to spectacles and has the object to provide simple and efficient means whereby the temples or bows may be held in a folded position across the lenses so that when the spectacles are not in use the same may be hung upon a hook carried on the breast of a person or otherwise disposed of with greater safety against breakage.

In the accompanying drawings: Figure 1 is a perspective view of a pair of spectacles embodying my invention. Fig. 2 is a similar view, on an enlarged scale, of one of the ears which forms part of the lens mounting and which is arranged at the outer end of one of the lenses and is pivotally connected with one of the temples or bows.

Like characters of reference indicate like parts in both figures.

1, 1 represent the two lenses which may be of any suitable construction. The mounting upon which these lenses are supported may be varied, that shown in the drawings comprising a bridge 2 which connects the opposing inner ends of the lenses and hinge ears 3, 3 secured to the outer ends of the lenses.

4, 4 represent the temples or bows each of which is pivotally connected at its front end with the hinge ear of one of the lenses so that the temples may be either projected rearwardly from the lenses for use or folded across the rear side of the lenses so that they are more compact when not in use. For the purpose of holding the temples in their folded position, holding means are provided which preferably comprise two hooks, 5, 5 each of which is arranged on the upper side of the hinge ear of one of the lenses and is adapted to be engaged by the free end of the temple which is pivoted on the hinge ear of the other lens. By this means the temples are securely held in place and prevented from unfolding, thereby permitting the same to be taken care of with greater safety when not in use particularly when the spectacles are hung on a hook carried on the breast of the wearer which hook is adapted to receive either one of two suspension eyes or loops 6 arranged on the hinge ears opposite the retaining hooks. By thus holding the temples in a folded condition they may be hung on the clothing of a person as is now commonly done with eye glasses, without liability of breaking or injuring the same.

I claim as my invention:

1. In spectacles, the combination with the lenses, the lens mounting and the temples pivotally connected with the lens mounting, of means for holding the temples in a folded position across the lenses.

2. In spectacles, the combination with the lenses, the lens mounting provided with ears at the outer ends of the lenses and temples pivotally connected with said ears and capable of being either projected rearwardly from the lenses or folded across the rear side of the lenses, of hooks one arranged on each of said ears and each adapted to be engaged by the temple pivoted on the other ear.

Witness my hand this 6th day of September, 1911.

FRANCES MORTON.

Witnesses:
 I. MORTON,
 THEO. L. POPP.

---

Copies of this patent may be obtained for five cents each, by addressing the "Commissioner of Patents, Washington, D. C."